Figure 1:
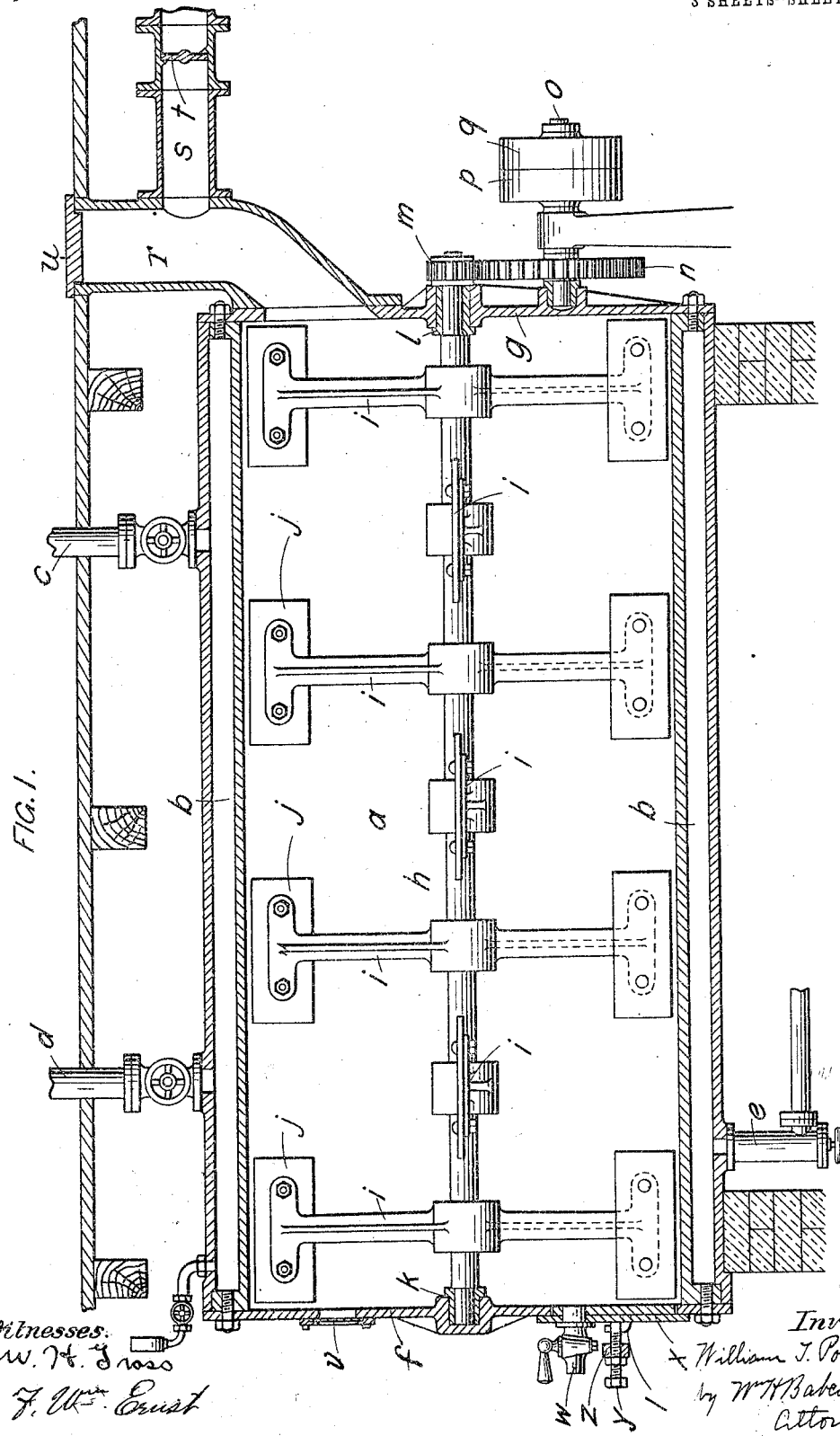

W. T. POWLING.
PROCESS FOR TREATING FATTY SUBSTANCES.
APPLICATION FILED MAR. 29, 1913.

1,121,598.

Patented Dec. 15, 1914.
3 SHEETS—SHEET 3.

Witnesses.
W. H. Tross
F. Wm. Ernst

Inventor.
William T. Powling,
by W. H. Babcock & Son
Attorneys

UNITED STATES PATENT OFFICE.

WILLIAM THOMAS POWLING, OF PRITTLEWELL, ENGLAND.

PROCESS FOR TREATING FATTY SUBSTANCES.

1,121,598.    Specification of Letters Patent.    Patented Dec. 15, 1914.

Application filed March 29, 1913. Serial No. 757,688.

*To all whom it may concern:*

Be it known that I, WILLIAM THOMAS POWLING, a subject of the King of England, residing at Prittlewell, England, have invented certain new and useful Improvements in Processes for Treating Fatty Substances, of which the following is a specification.

This invention relates to an improved process for treating bones, fats, offal, oil seeds and other oleaginous substances for the purpose of extracting the fat and moisture therefrom and has for its object improvements whereby (*a*) this purpose is more economically and expeditiously served, (*b*) improved products and increased facilities for handling the same are obtained, rendering the process less objectionable to the attendants; (*c*) frothing or "fobbing" is prevented and (*d*) the offensive odors and nuisances attending the treatment of such materials are to a large extent obviated.

Heretofore materials of the kind referred to have in some cases been treated with water and other solvents in a digester with the result that the glue and other gelatinous substances as well as the fat have been extracted from the residue thereby rendering it of little or no value as food for poultry, cattle and other animals. In the cases referred to the residue was utilized as manure.

The present improvements consist in operating upon the materials dealt with in comparatively small quantities without added water or other solvents in a closed horizontal cylindrical vessel surrounded by a heating surface into contact with which the materials operated upon are either constantly thrown in such a way as to cause them to be spread out in a substantially thin layer over the whole heating surface, or are successively carried in small quantities into close proximity with such heating surface without coming into actual contact therewith.

In order to carry out this process I employ a horizontal shaft journaled co-axially with the aforesaid cylindrical vessel. This shaft is provided with arms carrying horizontal blades which are driven at such a speed as to enable them to lift and throw the contents into contact with the entire circumference of the said cylindrical vessel.

In some cases the aforesaid blade carrying arms may be provided with a perforated drum open at its ends through which the material to be treated is introduced. By means of the aforesaid perforated drum and the blades therein the said material is maintained in contact with its periphery (which rotates in close proximity with the heating surface) during a suitable period while the drum is driven.

I am aware that it has heretofore been proposed to employ a digester consisting of a horizontal steam jacketed cylinder provided with stirrers adapted to keep the material under treatment on the move so as to prevent the caking of the solid material resting upon the heating surface and to conduce to the distribution of the heat in the material under treatment. In another case it was proposed to use scrapers to keep the interior heating surfaces of the digester clean. I am also aware that it has been proposed to dry the residue (after the digesting process has been completed) in a horizontal steam jacketed cylinder provided with pulverizers or agitators to break up the masses and so facilitate the evaporation of any moisture they contain by constantly exposing fresh surfaces of the material to the action of the hot gases and to that portion of the heating surface upon which it lies. In none of the foregoing cases was the material dealt with in small quantities nor were the stirrers or scrapers driven at such a speed as to throw the material into contact with the heating surface above the level of the material under treatment. It has also been proposed to treat carcasses and offal with steam in a steam jacketed horizontal cylinder having a slowly rotating cylindrical sieve therein the ends of which were closed. The material to be treated was in this case introduced into the cylindrical sieve through a man-hole in its circumferential walls and was subjected to a crushing process by a loose roller adapted to roll therein while the cylindrical sieve was slowly driven. In this case no blades were provided (which would have hindered the operation of the crushing roller) nor was the rotation of the sieve fast enough to carry its contents around with it so as to carry them in proximity with the upper heating surface of the cylinder.

According to one mode of carrying my invention into practice I employ a horizontal cylindrical vessel provided with a steam or other jacket and closed at the ends. The steam jacket is provided with suitable inlets and outlets, for steam or other heating media, and traps to draw off any condensed water. One end of the horizontal cylinder is preferably provided with an inspection opening or window preferably situated near its upper portion through which the progress of the operation may be watched or ascertained. A manhole is also provided preferably in the same end near the lower portion thereof through which the residue or "graves" may be withdrawn by means of a rake or other convenient well-known means after one operation has been completed and the fat drawn off. Above this manhole or near the upper edge of the cover thereof a suitable outlet or cock may be provided through which the fat or other liquor may be drawn. In some cases this cock may be dispensed with and the said liquor drawn off by slackening the said manhole cover.

The interior of the aforesaid horizontal vessel is provided with a shaft journaled at both ends preferably at the center of the cylinder. This shaft is provided with blades or lifters appropriately arranged throughout its length. Preferably alternate blades which extend on both sides of the shaft are set at an angle of 90°. This lifter shaft is driven at an appropriate speed by spur wheel and pinion or other suitable gearing from any convenient source of power, the speed being such as to throw the contents of the cylinder and so distribute it in a thin layer against the whole of the heating surface above the level of the material being treated. In this way the whole of the material being treated is constantly broken up so as to facilitate the getting away of the vapors generated and so prevent frothing or fobbing. The said material is also brought into intimate contact with the entire heating surface. The other end of the aforesaid cylindrical vessel is entered by a flue which is preferably inclined and through which the vapors generated pass to a condenser or into a chimney or other outlet. In this way or by means of any other suitable exhausting apparatus a partial vacuum may be formed in the aforesaid cylindrical vessel enabling the process to be carried out at a lower temperature. A vertical feeding throat enters the aforesaid vessel preferably at the same point so that the material on entering receives a preliminary heating from the hot vapors as they pass out. The feeding throat is provided with a suitable cover by means of which it is preferably closed during the operation of reducing the material under treatment. A valve is preferably provided in the flue to regulate the rate at which the vapor generated is allowed to pass off.

According to an alternative construction the interior shaft is provided with a perforated drum instead of the blades hereinbefore referred to. The diameter of this drum is such that its circumference is in close proximity with the heating surface so that any material fed into the interior of the said drum is brought into close proximity with such heating surface without making actual contact therewith until it has been reduced when it is drawn off. This arrangement is well adapted for the treatment of sweet fats which are uniformly heated and all burning and consequent discoloration are prevented. The aforesaid drum is provided with longitudinal radial vanes or the like by means of which the material fed into it is caused to rotate with it, and is thus constantly turned over and the hot gases thereby enabled to completely permeate it. This drum is driven at such a speed as to enable the contents to be maintained in contact with the periphery throughout its complete revolution by centrifugal force.

It will be understood that the apparatus is provided with suitable gages and other usual fittings of well-known kind.

I will now proceed to more particularly describe my invention with the aid of the accompanying drawings in which:—

Figure 2:
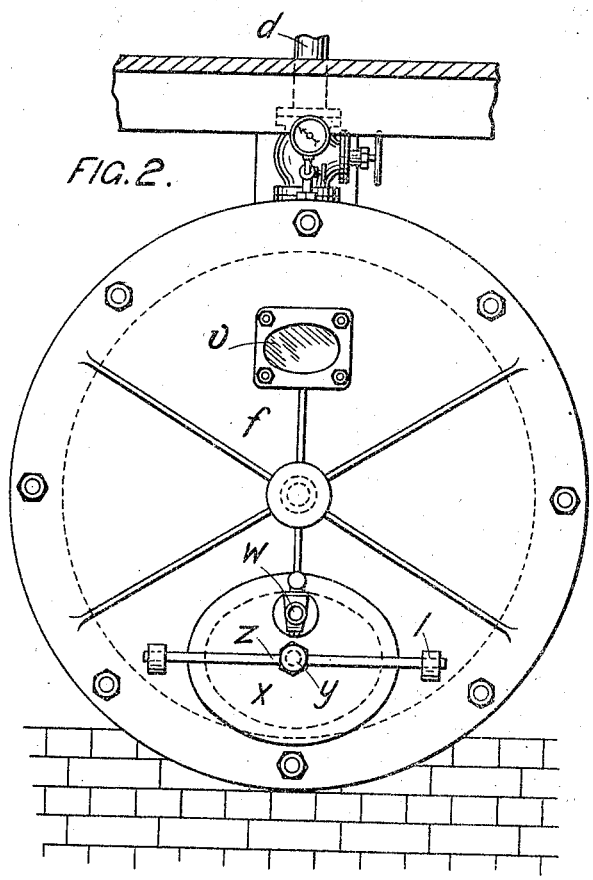
Figure 3:
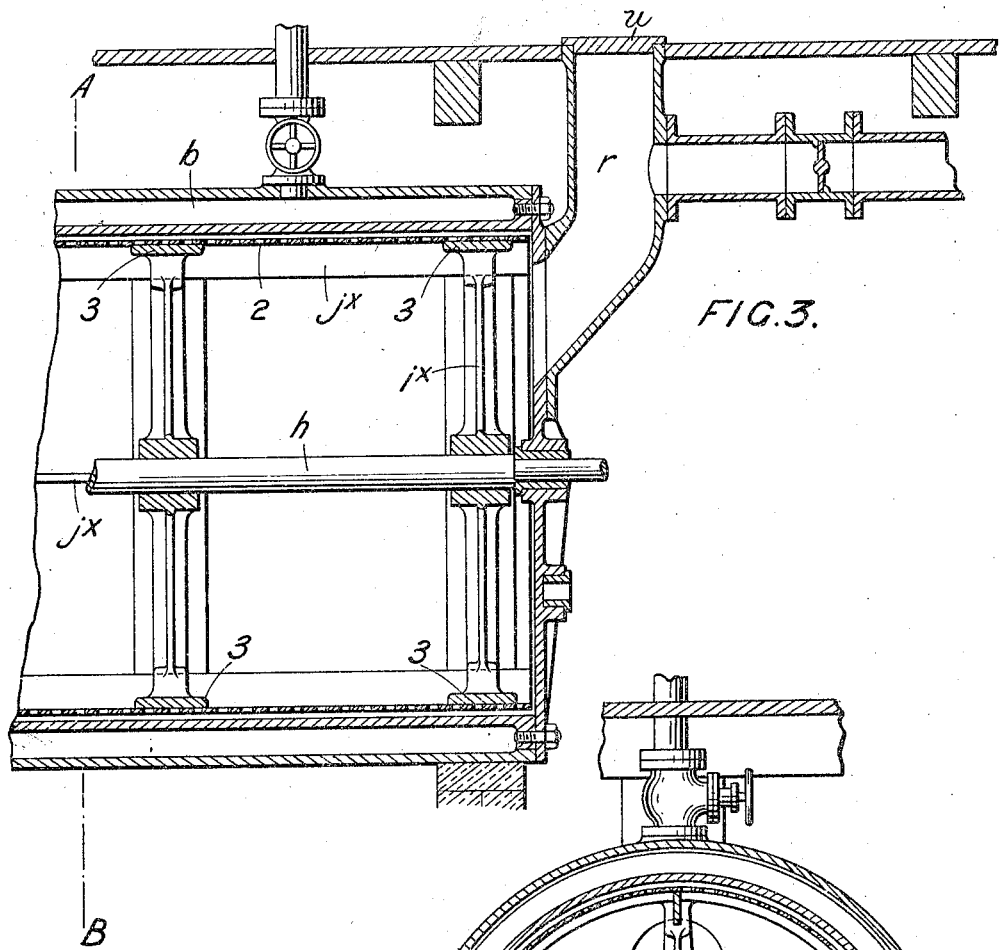
Figure 4:
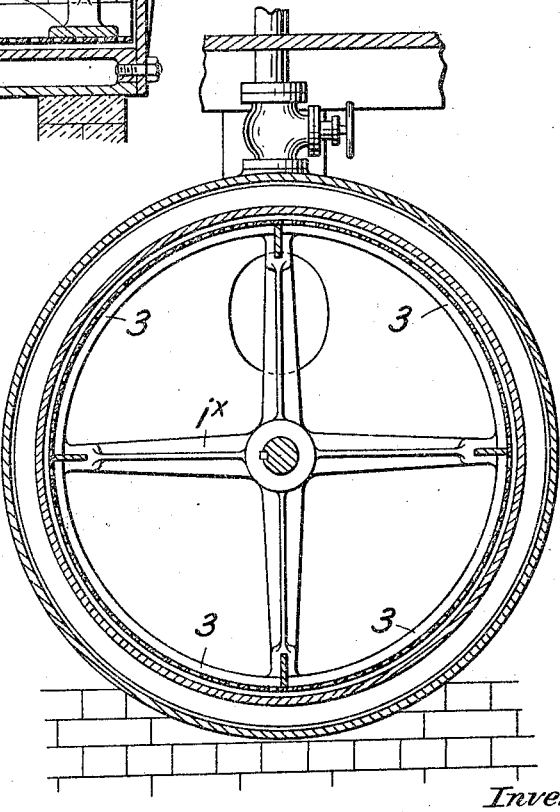

Figure 1 is a vertical longitudinal section through the improved apparatus. Fig. 2 is a front elevation thereof. Fig. 3 is a part longitudinal vertical section illustrating a modification, and Fig. 4 is a transverse section taken on the line A—B in Fig. 3.

According to the arrangement illustrated by Figs. 1 and 2 I employ a horizontal cylindrical vessel $a$ having a steam or other jacket $b$ provided with a suitable inlet $c$, outlet $d$ and trap $e$ to draw off any condensed water. Suitable end covers $f$ and $g$ are provided in which is journaled a shaft $h$ having arms $i$ mounted thereon alternately at an angle of 90°. These arms $i$ extend diametrically across the cylindrical vessel and are provided at their extremities with blades $j$ adapted when driven to lift and throw the contents of the cylindrical vessel $a$ into contact with the walls thereof which constitute the heating surface.

The shaft $h$ is carried at one end in a bearing $k$ which does not extend through the end cover $f$. The opposite end of the said shaft extends through a bearing $l$ in the end cover $g$ and is provided on the other side with a pinion $m$ which gears with a spur wheel $n$ mounted on the shaft $o$ provided with fast and loose pulleys $p$ $q$ by means of which the shaft $h$ is driven.

A feed throat $r$, which preferably extends through the floor above, enters the end cover $g$ through which the material to be treated is introduced into the apparatus. A flue $s$ which enters the throat $r$, is provided to carry off the gases and vapors which are given off during the process. This flue may be led into a chimney or a suitable exhausting apparatus whereby a partial vacuum may be maintained, and a door $t$ may be provided by means of which the rate at which the said vapors to be drawn off may be adjusted.

A suitable cover $u$ may be employed to close the feed throat $r$ and may be provided with means, not shown, for maintaining the same on its seat so as to prevent the escape of gases therethrough.

In practice steam or other suitable heating medium is caused to enter the jacket $b$ through the inlet $c$ and the shaft $i$ is driven at such a speed as will enable the blades $j$ carried by the arms $i$ to continuously throw the contents of the cylindrical vessel $a$ into contact with its entire heating surface. The material to be treated is then introduced through the throat $r$ and is at first deposited at that end of the vessel but is subsequently distributed throughout its length by the operation of the blades $j$. During the process, progress may be observed through the window $v$ and when the fat and other material has been sufficiently reduced the cock $w$ is opened and the fluid contents drawn off. The man-hole cover $x$ is then removed and the graves or other residue withdrawn by means of a rake or other convenient means.

When the apparatus is at work the manhole cover $x$ is maintained in position by a setscrew or its equivalent $y$ which passes through a screw-threaded hole in a bar $z$ whose ends enter open slots formed in the lugs 1.

In some cases the cock $w$ may be dispensed with and the fluid contents withdrawn by slackening the fastenings of the manhole cover $x$ which permits them to percolate through the same. The apparatus may be mounted on a suitable brickwork setting or otherwise supported in any convenient manner.

According to the modification illustrated by Figs. 3 and 4 which is better adapted for the treatment of sweet fats, the blades $j^x$ which extend the full length of the cylindrical vessel and are carried by the arms $i^x$ mounted on the shaft $h$, are surrounded by a perforated drum 2 into which the material fed through the throat $r$ is introduced. Preferably the arms $i^x$ support segmental rims 3 which stiffen and maintain the cylindrical form of the perforated drum 2. By means of this perforated drum the material thrown by the blades $j^x$ is prevented from coming into actual contact with the heating surface of the cylindrical vessel. In this way burning is avoided and consequently discoloration is prevented.

For the purpose of treating oil seeds or bones, I prefer to first crush or otherwise reduce them to small pieces.

I claim:

The process for melting and treating tallow and other fats and for degreasing bones and the like consisting in dealing with comparatively small quantities of the material to be treated without added water or other solvents in a horizontal jacketed cylinder wherein such material is lifted or thrown by blades or equivalent parts driven at such a speed as to continually lift or throw such material into contact or close proximity with substantially the entire heating surface in a substantially thin layer until the oleaginous matter has been melted and the aqueous constituents sufficiently evaporated substantially as described in the specification.

In testimony whereof I have signed my name to this specification in the presence of two subscribing witnesses.

WILLIAM THOMAS POWLING.

Witnesses:
 EDGAR A. GODDIN,
 JOHN W. MACHATTIE.